United States Patent
Dukart et al.

(10) Patent No.: US 7,958,962 B2
(45) Date of Patent: Jun. 14, 2011

(54) DEVICE FOR DETECTING A COLLISION OF A VEHICLE WITH AN OBSTACLE

(75) Inventors: Anton Dukart, Gerlingen (DE);
Thorsten Sohnke, Liederbach (DE);
Mirko Ruhs, Heppenheim (DE)

(73) Assignee: Robert Bosch GmbH, Stuttgart (DE)

( * ) Notice: Subject to any disclaimer, the term of this patent is extended or adjusted under 35 U.S.C. 154(b) by 847 days.

(21) Appl. No.: 11/661,718

(22) PCT Filed: Aug. 1, 2005

(86) PCT No.: PCT/EP2005/053731
§ 371 (c)(1),
(2), (4) Date: Nov. 14, 2007

(87) PCT Pub. No.: WO2006/027293
PCT Pub. Date: Mar. 16, 2006

(65) Prior Publication Data
US 2009/0188742 A1    Jul. 30, 2009

(30) Foreign Application Priority Data

Sep. 6, 2004    (DE) .................... 10 2004 043 597

(51) Int. Cl.
*B60K 28/10* (2006.01)
*B60Q 5/00* (2006.01)
(52) U.S. Cl. .......... 180/274; 280/735; 340/436; 701/45
(58) Field of Classification Search ............... 180/274; 280/734, 735; 340/425.5, 436; 701/45–47, 701/300–302
See application file for complete search history.

(56) References Cited

U.S. PATENT DOCUMENTS

| | | | |
|---|---|---|---|
| 4,346,914 A * | 8/1982 | Livers et al. .................. | 280/735 |
| 4,842,301 A | 6/1989 | Feldmaier et al. | |
| 4,934,478 A * | 6/1990 | Melocik et al. ............... | 180/275 |
| 5,261,505 A * | 11/1993 | Holroyd et al. ............... | 180/274 |
| 5,884,203 A * | 3/1999 | Ross .............................. | 701/45 |
| 6,595,544 B1 | 7/2003 | Hermann | |
| 6,678,599 B2 * | 1/2004 | Eisele et al. .................... | 701/45 |
| 6,810,313 B2 * | 10/2004 | Cooper et al. .................. | 701/45 |
| 6,902,025 B2 * | 6/2005 | Spies ............................ | 180/274 |
| 7,231,803 B2 * | 6/2007 | Stuetzler ..................... | 73/12.01 |
| 7,278,657 B1 * | 10/2007 | McCurdy ...................... | 280/735 |
| 7,605,691 B2 * | 10/2009 | Nonaka et al. ................ | 340/436 |
| 7,675,820 B2 * | 3/2010 | Griffin et al. ................. | 367/127 |
| 7,711,467 B2 * | 5/2010 | Nonaka et al. ................ | 701/45 |
| 2006/0097495 A1 * | 5/2006 | Stuetzler ...................... | 280/735 |

FOREIGN PATENT DOCUMENTS

| | | |
|---|---|---|
| DE | 36 37 165 | 5/1988 |
| DE | 102 06 351 | 9/2003 |
| EP | 0 305 654 | 3/1989 |
| EP | 0 904 989 | 3/1999 |

* cited by examiner

*Primary Examiner* — Eric Culbreth
*Assistant Examiner* — Laura Freedman
(74) *Attorney, Agent, or Firm* — Kenyon & Kenyon LLP

(57) ABSTRACT

A device is proposed for detecting a collision of a vehicle with an obstacle, in which an ultrasonic receiver unit is used to detect the sound produced by the collision, and a collision of the vehicle is thus detected through the evaluation of the ultrasonic signals.

14 Claims, 3 Drawing Sheets

DEVICE FOR DETECTING A COLLISION OF A VEHICLE WITH AN OBSTACLE

BACKGROUND OF THE INVENTION

1. Field of the Invention

The present invention relates to a collision detection device for a vehicle.

2. Background Information

It is already known to use ultrasonic sensors for distance measurement in vehicles. Preferably, the ultrasonic sensors are realized as transceiver units for ultrasonic signals. An ultrasonic signal is sent out by the ultrasonic transceiver unit and is reflected by an obstacle in the surrounding environment of the vehicle. The reflected signal is then received by the ultrasonic transceiver unit. From the propagation time and the speed of sound, a distance of the obstacle from the ultrasonic sensor is determined. Preferably, this measured distance is used to operate a warning device that warns a driver of the vehicle against approaching too close to obstacles. In order to enable the reception of the ultrasonic signals, the ultrasonic transceiver unit has a membrane capable of oscillation on which a piezo-element is situated. In a first operating mode, the piezo-element is used to excite the membrane to oscillation, and thus to send out ultrasonic signals. In addition, oscillations received by the membrane are also transmitted to the piezo-element, so that the oscillations have the result that at the piezo-element a voltage corresponding to the oscillations can be picked off, amplified, and evaluated in order to determine the propagation time of the reflected signal and to obtain the distance value therefrom.

In addition, in vehicles it is known to use acceleration sensors that detect a sudden deceleration of the vehicle. If the vehicle collides with an obstacle and is sharply decelerated by this collision, the resulting deceleration can be detected via the acceleration sensor. Dependent on the detected deceleration, restraint devices in the vehicle can be triggered, for example, a safety belt or an airbag.

BRIEF SUMMARY OF THE INVENTION

The device according to the present invention for detecting a collision of a vehicle with an obstacle has the advantage that an ultrasonic receiver unit is used to recognize a collision with an obstacle. Here, the receiver unit of the membrane is used to detect sound that is produced by a collision of the vehicle with an obstacle. If the vehicle collides with the obstacle, the body of the car, or parts thereof, are deformed by this collision. This deformation produces sound that propagates through the air and in particular also through the vehicle. The sound waves also reach the ultrasonic receiver unit. Although the membrane of the ultrasonic receiver unit is in general designed for a particular ultrasonic frequency, strong oscillations in this frequency range are also triggered by a deformation caused by the collision. Beyond a pure distance measurement, the ultrasonic sensor can also detect the actual beginning point of a collision during an evaluation of these sound signals. As a collision begins to occur, the sound signals produced by it can already be detected, so that it is not necessary for a high acceleration first to occur in the vehicle, whereupon, for example, an acceleration sensor can first detect the occurrence of a collision.

Through collision acquisition by the ultrasonic receiver unit, measurement values of the acceleration sensor can at least tested for plausibility. If, for example, only a very strong braking is taking place, and a collision is not occurring, it will not be necessary to trigger a safety device, e.g., the airbag. On the other hand, the triggering process can be accelerated if a collision is actually present. In this way, passenger safety can be increased by an early recognition of a collision with an obstacle, in particular with another vehicle.

It is advantageous to situate the ultrasonic receiver unit in a bumper of the vehicle, or on the side of the vehicle, because here the earliest impact point of an obstacle with the vehicle is to be expected. In this way, the ultrasonic receiver unit is as close as possible to the location at which the sound arising during a collision is produced.

In particular, it is advantageous to evaluate the amplitude and/or the duration of the produced sound signal. This can be used to determine information about the degree of severity of a collision. This can be used to prevent an unnecessary triggering of the airbag, for example in the case of minor collisions.

In addition, it is particularly advantageous to provide an interface for communicating collision warning information to a restraint device in the vehicle, in order to, on the one hand, enable an early triggering of such a restraint device, while on the other hand, avoiding an unnecessary triggering.

In addition, it is advantageous to configure the ultrasonic receiver unit in such a way that in general it can also be used to determine the distances from obstacles in the surrounding environment of the vehicle. On the one hand, in this way the installation of additional receiver units can be done without, and on the other hand, an additional function is enabled for an ultrasonic distance measurement unit in the vehicle, which can further increase passenger safety.

DETAILED DESCRIPTION OF THE INVENTION

Figure 1:
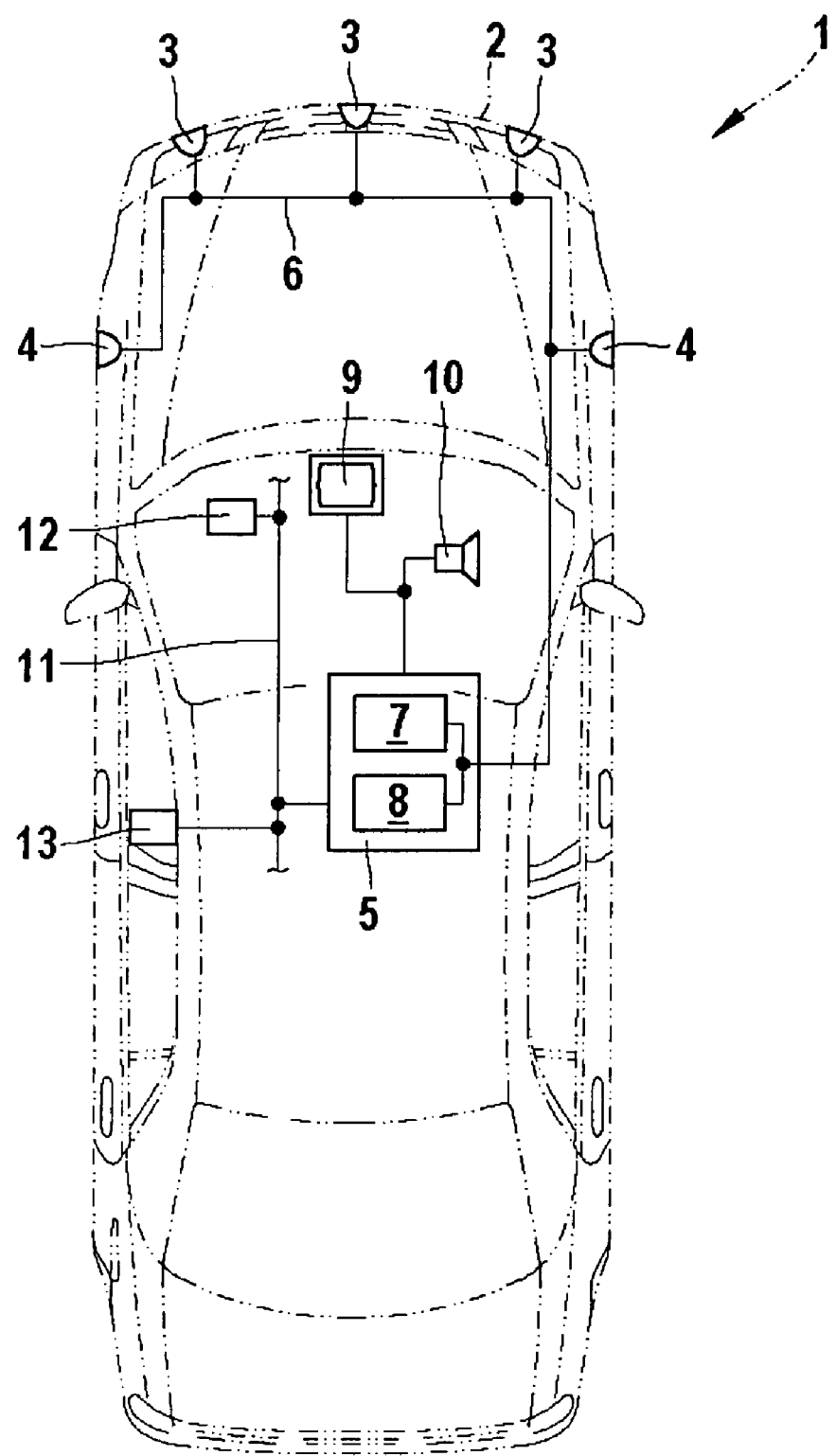
FIG. 1 shows an example embodiment of a device according to the present invention for detecting a collision of a vehicle with an obstacle.

The device according to the present invention for detecting a collision is illustrated in connection with FIG. 1, which shows the front area of a motor vehicle 1, and ultrasonic sensors 3 are situated at the front side 2 of the vehicle. Ultrasonic sensors 4 are also situated on the left and on the right side of the vehicle. In the present specific embodiment, ultrasonic sensors 3, 4 are realized as ultrasonic transceiver units. However, for the operation of the device according to the present invention for collision acquisition, ultrasonic sensors that operate only as ultrasonic receiver units are sufficient. Ultrasonic sensors 3, 4 may be situated in a bumper of the vehicle. Alternatively, the laterally situated ultrasonic sensors 4 can also be installed in a side area of the vehicle body.

Ultrasonic sensors 3, 4 are connected to an evaluation unit 5 via a data bus 6. In a first example embodiment, ultrasonic sensors 3, 4 transmit sound signals immediately to evaluation unit 5. In another example embodiment, the received sound signals can also be evaluated immediately in the ultrasonic sensors in order to discover what distance is present to an obstacle, or whether a collision is present. In this case, a result signal is sent to evaluation unit 5 for further evaluation. In an example embodiment, a binary sound signal is transmitted.

This binary sound signal is obtained by setting the binary evaluation signal to the value 1 when a predetermined amplitude value is exceeded. If the detected amplitude is less than this value, the signal is set to the value 0. The binary evaluation signal is subsequently further processed by the evaluation unit. For this purpose, in the example embodiment described here, evaluation unit 5 has a first processing unit 7 for determining distance. In addition, in an example embodiment according to the present invention, the evaluation unit has at least one component unit for determining a collision. In the specific embodiment shown here, evaluation units 7, 8 are combined in one evaluation unit 5. However, they can also be situated separately in the vehicle.

In an example embodiment, evaluation unit 5 is connected to output units for warning the driver. In particular, it is connected to a display 9 that warns the driver of a collision with obstacles. For this purpose, a warning symbol is presented when the vehicle comes too close to an obstacle. In addition, a current distance value can also be shown in numerical form or symbolically. In addition, evaluation unit 5 is connected to a loudspeaker 10 that outputs signal tones dependent on the distance of the vehicle from an obstacle. However, if a more serious collision is already taking place, an outputting of warnings via output unit 9, 10 in general no longer makes sense, because the driver can no longer react.

If evaluation unit 5 detects a collision, a corresponding item of information is transmitted via a second data bus 11, e.g., a CAN bus, to restraint devices in the vehicle. For example, an airbag 12 and/or a safety belt 13 is here connected to the data bus. In addition, additional restraint means can be connected to the data bus. These can be, for example, additional airbag units in the vehicle, e.g., a side airbag.

Figure 2:
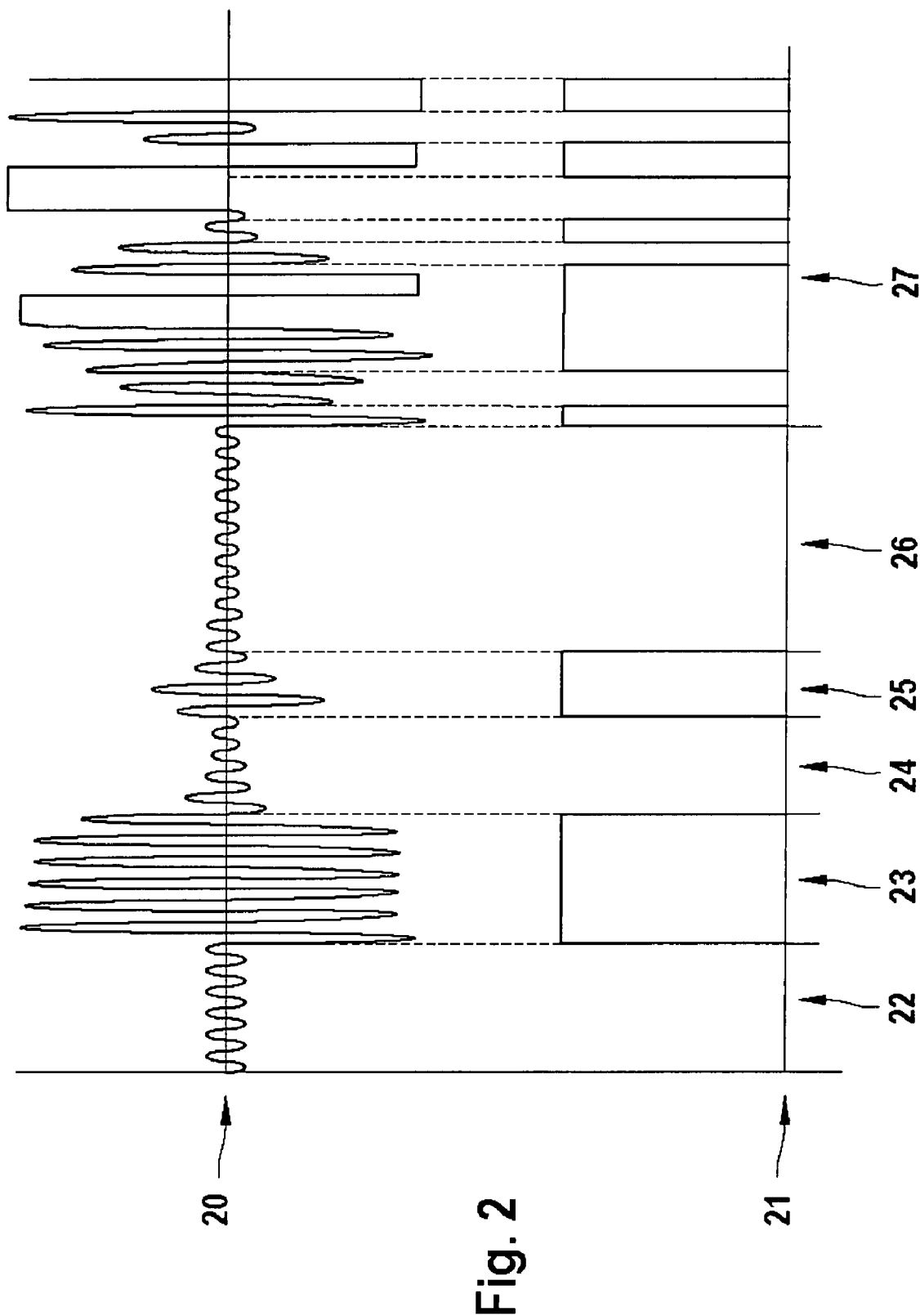
FIG. 2 shows an example of a measurement signal for a distance measurement and for an acquisition of a sound signal in the case of a collision in accordance with the present invention.

In connection with FIG. 2, the operation of the collision warning device according to FIG. 1 is explained. In the first graphic plot 20 of FIG. 2, a temporal curve is shown of a sound signal received by an ultrasonic receiver unit, plotted over time. In the second graphic plot 21, a binary evaluation signal, produced by the ultrasonic receiver unit dependent on the received sound signal, is shown, likewise plotted over time. In a first time interval 22, ultrasonic receiver unit receives only interference signals, produced for example by the driving movement of the vehicle. The binary evaluation signal is set to the value 0. In second time interval 23, the ultrasonic sensor sends out a signal. This excites the membrane to oscillation. Here, the binary evaluation signal is set to the value 1. Third time interval 24 corresponds to the time that the sound signal requires in order to be reflected by the obstacle. Finally, in fourth time interval 25 the reflected sound signal is received, whose amplitude is significantly less than that of the sound signal that was sent out. This is due to the fact that the sent sound signal is attenuated during the reflection process.

In a subsequent, fifth, time interval 36, the ultrasonic sensor is operated without a signal being sent out. Subsequently, in sixth time interval 27 a collision occurs. Due to the deformation of the body, a sound signal is produced having a random pattern, in which a binary evaluation signal is produced in a stochastic signal sequence without a signal being sent out. In contrast to the regular patterns, or in contrast also to individual, rarely occurring false detections of the ultrasonic signal, the presence of a collision can be inferred from the stochastic pattern of the received sound signal.

Figure 3:
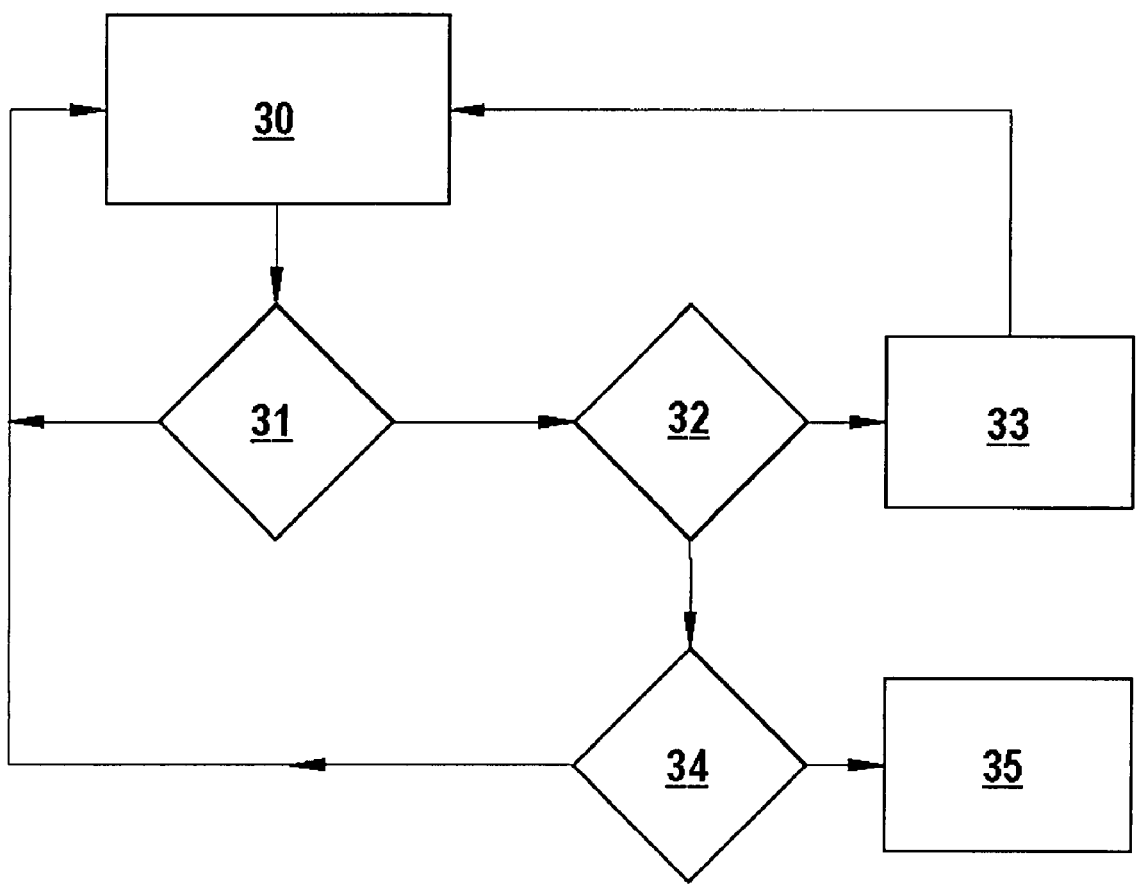
FIG. 3 shows the flowchart for an example method according to the present invention for collision detection.

FIG. 3 shows a method according to the present invention for collision acquisition. In a measurement step 30, the receiver unit is operated such that, in a first test step 31, evaluation unit 5 checks at regular time intervals to see whether a binary evaluation signal of one of the ultrasonic receiver units has been set to the value 1. If this is not the case, branching back to measurement step 30 takes place for the repetition of a query. If an evaluation signal is measured, then in a second test step 32 it is checked whether a transmit signal was previously sent out for which no echo has yet been received. If this is the case, branching takes place to a distance evaluation step 33, in which the distance is determined from the propagation time of the sent, reflected signal. Dependent on the distance, a warning corresponding to the distance, e.g., an optical and/or acoustic signal, is emitted to the driver. After the distance evaluation, branching takes place back to measurement step 30. If in second test step 32 it was determined that no signal was previously sent out, branching takes place to a third test step 34. In third test step 34, it is checked whether the detected signal is an individual interference signal, i.e., a possible false detection. If no additional sound signals arrive within a predetermined time segment, e.g., a millisecond, a false signal is probably present, and branching takes place back to measurement step 30. However, if additional signals arrive that have changing width and changing temporal intervals, a collision is probably present. Therefore, branching takes place to a collision warning step 35. In collision warning step 35, a corresponding collision warning is forwarded to a control unit of restraint devices in the vehicle. In an example embodiment, the restraint devices can thus be switched at least into an alarm state. Other collision acquisition devices can be tested for plausibility with respect to a possible collision detected by them. In another example embodiment, a restraint device in the vehicle can also be triggered immediately, dependent on the collision warning signal transmitted by the evaluation unit. In addition, arbitrary other devices, such as, for example, an automatic emergency call transmitter, a brake servo cylinder, an automatic door unlocking, or a device for cutting off the fuel supply, can automatically take the received signal into account and can carry out the provided function in the case of a collision.

In an example operating mode, the evaluation unit selects the received binary evaluation signals in such a way that it determines the severity of a collision on the basis of the duration of individual signals and from the duration of the signal transmission. A collision is more severe the more signals arrive and the longer the signals last, because in this case the deformation of the body is more severe, so that a more intensive sound signal is produced. In this way, evaluation unit 5 can also determine the severity of a collision, and can send corresponding information concerning the severity of the collision to the restraint device in the vehicle.

What is claimed is:

1. A device for detecting a collision of a vehicle with an obstacle, comprising:

an ultrasonic transmitter and receiver unit situated in the vehicle so that a sound produced by a deformation of at least one body part of the vehicle is transmitted to the ultrasonic transmitter and receiver unit; and an evaluation unit operatively coupled to the ultrasonic receiver unit, wherein the ultrasonic transmitter and receiver unit transmits to the evaluation unit a signal related to the detected sound, wherein the evaluation unit evaluates the transmitted signal related to the detected sound to determine whether a collision of the vehicle with an obstacle has occurred, and wherein the evaluation unit receives an indicator of receiving elevated ultrasonic signals at the ultrasonic transmitter and receiver, and wherein the evaluation unit checks whether a test signal had previously been transmitted from the device for which no echo has been received at the ultrasonic transmitter and receiver, and if so, the evaluation unit determines a distance from the obstacle based on the received elevated ultrasonic signals, and if not, the evaluation unit determines whether additional elevated ultrasonic signals are received at the ultrasonic transmitter and receiver over a predetermined time period for a determination of the collision.

2. The device as recited in claim 1, wherein the ultrasonic transmitter and receiver unit is situated one of: a) in a bumper area of the vehicle; and b) at a side of the vehicle.

3. The device as recited in claim 2, wherein the evaluation unit determines a degree of severity of the collision on the basis of at least one of an amplitude and a duration of the signal related to the detected sound produced by the deformation of the body part.

4. The device as recited in claim 3, wherein the degree of severity of the collision is communicated to a passenger safety device within the vehicle.

5. The device as recited in claim 3, further comprising:
an interface for communicating information regarding the detected collision to a control device of a passenger-restraint device in the vehicle.

6. The device as recited in claim 3, wherein the evaluation unit is configured to determine a distance of the vehicle from a target object in the surrounding environment of the vehicle, based on a propagation time of an ultrasonic signal received by the ultrasonic transmitter and receiver unit.

7. The device as recited in claim 1, wherein the evaluation unit is configured to determine a distance of the vehicle from a target object in the surrounding environment of the vehicle, based on a propagation time of an ultrasonic signal received by the ultrasonic transmitter and receiver unit.

8. A method for determining a collision of a vehicle with an obstacle, comprising:
detecting, by an ultrasonic transmitter and receiver unit situated in the vehicle, a sound produced by a deformation of a body part of the vehicle;
transmitting, from the ultrasonic transmitter and receiver unit to an evaluation unit, a signal related to the detected sound;
evaluating, by the evaluation unit, the transmitted signal related to the detected sound to determine whether a collision of the vehicle with an obstacle has occurred;
receiving, by the evaluation unit, an indicator of receiving elevated ultrasonic signals at the ultrasonic transmitter and receiver; and
checking, by the evaluation unit, whether a test signal had previously been transmitted from the device for which no echo has been received at the ultrasonic transmitter and receiver, and if so, determining a distance from the obstacle based on the received elevated ultrasonic signals, and if not, determining whether additional elevated ultrasonic signals are received at the ultrasonic transmitter and receiver over a predetermined time period for a determination of the collision.

9. The method as recited in claim 8, wherein the ultrasonic transmitter and receiver unit is situated one of in a bumper area of the vehicle and at a side of the vehicle.

10. The method as recited in claim 9, wherein the evaluation unit determines a degree of severity of the collision on the basis of at least one of an amplitude and a duration of the signal related to the detected sound produced by the deformation of the body part.

11. The method as recited in claim 10, wherein the degree of severity of the collision is communicated to a passenger safety device within the vehicle.

12. The method as recited in claim 10, further comprising:
communicating, through an interface, information regarding the detected collision to a control device of a passenger-restraint device in the vehicle.

13. The method as recited in claim 8, further comprising:
communicating, through an interface, information regarding the detected collision to a control device of a passenger-restraint device in the vehicle;
wherein the ultrasonic transmitter and receiver unit is situated one of in a bumper area of the vehicle and at a side of the vehicle, wherein the evaluation unit determines a degree of severity of the collision on the basis of at least one of an amplitude and a duration of the signal related to the detected sound produced by the deformation of the body part, and wherein the degree of severity of the collision is communicated to a passenger safety device within the vehicle.

14. The method as recited in claim 13, wherein the evaluation unit is configured to determine a distance of the vehicle from a target object in the surrounding environment of the vehicle, based on a propagation time of an ultrasonic signal received by the ultrasonic transmitter and receiver unit.

* * * * *